United States Patent [19]

Pitzer et al.

[11] Patent Number: 4,983,371
[45] Date of Patent: Jan. 8, 1991

[54] SILICON NITRIDE POWDER OF LOW OXYGEN CONTENT

[75] Inventors: Ulrike Pitzer; Benno Laubach; Gerhard Franz, all of Krefeld, Fed. Rep. of Germany

[73] Assignee: Bayer Aktiengesellschaft, Leverkusen, Fed. Rep. of Germany

[21] Appl. No.: 396,328

[22] Filed: Aug. 21, 1989

[30] Foreign Application Priority Data

Aug. 31, 1988 [DE] Fed. Rep. of Germany ....... 3829503

[51] Int. Cl.$^5$ .................. C01B 21/68; C04B 35/58
[52] U.S. Cl. ........................................ 423/344; 501/97
[58] Field of Search ........................... 423/344; 501/97

[56] References Cited

U.S. PATENT DOCUMENTS

| 4,284,432 | 8/1981 | Nishida et al. | 501/98 |
| 4,341,874 | 7/1982 | Nishida et al. | 501/97 |
| 4,405,589 | 9/1983 | Twai et al. | 423/344 |
| 4,640,903 | 2/1987 | Matsuhiro et al. | 501/97 |

FOREIGN PATENT DOCUMENTS

| 0219764 | 4/1987 | European Pat. Off. . |
| 0251322 | 7/1987 | European Pat. Off. . |
| 2020264 | 1/1979 | United Kingdom . |

OTHER PUBLICATIONS

Ceramic materials and components for Engines Proceedings of 2nd International Symposium 1986.
C. Greskovich, et al. "Basic Research on Technology Development for Sintered Ceramics", Tech. Rep. No. AFML TR-76-179, General Electric Co., Schnectady, NY 1976.

Primary Examiner—Gary P. Straub
Assistant Examiner—Lori F. Cuomo
Attorney, Agent, or Firm—Connolly and Hutz

[57] ABSTRACT $Si_3N_4$ powder wherein the total oxygen content of the powder is 0.4% by weight or less is produced by preparing an amorphous $Si_3N_4$ intermediate by reacting a Si-containing compound with an N-containing compound and the intermediate is then crystallized wherein "P", multiplication product of
  (i) the specific surface of the amorphous intermediate (BET in m$^2$/g),
  (ii) the moisture content $C_{H_2O}$ (in volume ppm) of the atmosphere during handling and
  (iii) the time t in hours required for handling the amorphous intermediate,
is kept smaller than the limit value product $P_G$ of 1000 in accordance with the following equation:

"P"=BET (m$^2$/g)×$C_{H_2O}$(vol ppm)×$t(h)$<$P_G$.

3 Claims, No Drawings

SILICON NITRIDE POWDER OF LOW OXYGEN CONTENT

This invention relates to Si$_3$N$_4$ powder of low oxygen content and to a process for its production.

BACKGROUND OF THE INVENTION

Silicon nitride powders are contaminated above all by a certain amount of oxygen. In commercial powders, the oxygen content is between about 0.8% by weight and 2.5% by weight (G. Ziegler, J. Heinrich, G. Wötting, J. Mater. Sci. 22 (1987), 3041–3086).

Although the oxygen is really regarded as contaminating the powder, it is actually desired to a limited extent for sintering processes carried out in the absence of pressure or under gas pressure to improve the sintering activity of the silicon nitride power. Sintering additives are added to the powder for sintering, forming liquid phases together with the oxygen present in the powder at the sintering temperature and thus enabling the material to be compacted. Overall, an oxygen content of approximately 1.5% by weight is regarded as optimal for sintering under gas pressure.

However, the oxygen has an adverse effect on the mechanical properties, particularly at high temperatures, because it lower the glass temperature of the secondary phases and hence reduces strength and creep resistance at high temperatures.

For hot isostatic sintering, however, the content of sintering additives and hence the oxygen content can be lower. Moldings produced by hot isostatic pressing from Si$_3$N$_4$ powders having an oxygen content described as particularly low of 0.8% by weight show particularly good mechanical properties (R. R. Wills, M. C. Brockway), L. G. McCoy, D. E. Niesz, Ceram. Eng. Sci. Proc. 1 (1980), pages 34–39). However, even under inert or reducing conditions as described in U.S. Pat. No. 4,405,589, it has not hitherto been possible to obtain powders having a lower oxygen content than 0.8% by weight.

Accordingly, the object of the present invention is to provide Si$_3$N$_4$ powders which do not have any of the described disadvantages of the prior art.

BRIEF DESCRIPTION OF THE INVENTION

Si$_3$N$_4$ powders having a total oxygen content of or less than 0.4% by weight which satisfy these requirements have now surprisingly been found and are th subject of the present invention. The Si$_3$N$_4$ powders preferably have a total oxygen content of less than 0.25% by weight.

DETAILED DESCRIPTION OF THE INVENTION

The present invention also relates to a process by which it is possible to produce the Si$_3$N$_4$ powders according to the invention. Suitable starting materials are amorphous Si$_3$N$_4$ intermediates of the type obtainable by reaction of SiCl$_4$ with ammonia (DE-A No. 35 36 933; DE-C No. 15 023; G. Franz, L. Schöfelder, U. Wickel, Ceramic Materials and Components for Engines, Proc. 2nd Int. Symp., Deutsche Keramische Ges (1986)). This reaction may be carried out either at room temperature or at temperatures below 0° C. in a liquid-phase reaction or at temperatures between about 70° C. and 1600° C. in a gas-phase reaction. Depending on the production process, the specific surface (BET) of the Si$_3$N$_4$ intermediate varies between about 1000 m$^2$/g (liquid-phase process) and about 100 m$^2$/g (gas-phase process at T>1000° C.).

These amorphous Si$_3$N$_4$ intermediates are extremely sensitive to moisture to an extent which is greater, the higher the specific surface of the powder. The amorphous intermediates are converted into crystalline Si$_3$N$_4$ in another process step by heating at temperatures above 1300° C.

It has often been described that the production of Si$_3$N$_4$ powders must be carried out in the absence of air and moisture (U.S. Pat. Nos. 4,405,598 and 4,122,155). However, these powders do not show the necessary absence of oxygen.

However, it has now surprisingly been found that the absence of air and moisture on the typical technical scale is sufficient for the production of the powders according to the invention. This is achieved by a process for the production of the Si$_3$N$_4$ powders according to the invention in which an amorphous Si$_3$N$_4$ intermediate is produced by reaction of an Si-containing compound with an N-containing compound and is subsequently crystallized, the product P of the specific surface of the amorphous intermediate (BET in m$^2$/g), the moisture content C$_{H_2O}$ (in vol ppm) of the atmosphere prevailing during handling and the time t (in h) required for handling the amorphous intermediate being kept smaller than the limit value product P$_G$ of 1000 in accordance with the following equation:

$$P = \text{BET } (m^2/g) \times C_{H_2O} \text{ (vol ppm)} \times t \text{ (h)} < P_G.$$

Unless this limit value is observed, the total oxygen content rises to a value of greater than 0.4%.

The product P may best be kept below the value of 1000 by starting out from an amorphous intermediate which has a BET of no more than 250 m$^2$/g. However, since the intermediate is intended to lead to a very finely divided end product, it should have a BET of at least 100 m$^2$/g. A powder such as this may be produced with advantage by a gas phase reaction between SiCl$_4$ and NH$_3$ at temperatures above 1000° C. On an industrial scale, nitrogen can be produced in such pure form by splitting air under controlled conditions that its moisture content is no more than 5 ppm. By working quickly in the critical phase between production of the amorphous intermediate, which is highly reactive by virtue of its high BET, and crystallization, it is possible to limit the handling time to t<1 h. Since the BET and hence reactivity decrease rapidly even at the beginning of crystallization, the crystallization time is negligible in regard to a possible increase in the oxygen content. If amorphous intermediate products having a BET of approximately 1000 m$^2$/g are used as the starting material, the technical nitrogen has to be purified to a moisture content of distinctly below 1 ppm and the handling time further reduced to keep below the limit value product P$_G$ of 1000. These measures can only be carried out with considerable technical outlay.

In one particular embodiment, in which the moisture content and handling time are further reduced, it is possible to keep below limit value products P$_G'$ of 500 using amorphous intermediates having a BET of approximately 250 m$^2$/g. In this way, the oxygen content of the crystalline Si$_3$N$_4$ powder can be reduced to less than 0.25% by weight.

At the same time, the moisture content of the nitrogen may also be reduced to around 1 vol ppm on an industrial scale without significant effort. By automation, the handling time can be reduced to around 5 minutes in the most favorable case.

The specific BET surface may be determined in accordance with DIN 66 131 = British Standard Institution 4359, Part 1 (1969) (one-point method $N_2$ adsorption). The oxygen content is determined by the inert gas fusion technique, in which an $Si_3N_4$ sample is weighed into a graphite crucible an heated beyond 1800° C. in a stream of helium. The oxygen present in the sample is reacted to CO which is quantatively determined by means of an IR measuring cell.

The following Examples are intended to illustrate the $Si_3N_4$ powders according to the invention and their production without limiting them in any way.

EXAMPLE 1

An amorphous $Si_3N_4$ intermediate is prepared by reaction of $SiCl_4$ with $NH_3$ in the gas phase at a reaction temperature of 1400° C. and subsequent dechlorination. This intermediate has a BET of 200 m²/g. 150 g of this amorphous intermediate are introduced into a crystallization boat within a period of 45 minutes and then crystallized for 60 minutes at a temperature of 1450° C. The moisture content in the atmosphere prevailing during handling is lower than 5 ppm. The product P may thus be calculated as:

$$P = 200 \ (m^2/g) \times 0.75 \ (h) \times 5 \ (ppm) = 750 \ (<1000).$$

The oxygen content of the crystallized powder is determined by inert gas fusion technique and is 0.30% by weight.

EXAMPLE 2

An amorphous $Si_3N_4$ intermediate having a BET surface of 200 m²/g is prepared as in Example 1. The moisture content in the atmosphere prevailing during handling is again below 5 ppm. By improving the test arrangement, the time taken to introduce 150 g intermediate into a crystallization boat is shortened to 15 minutes (0.25 h). The amorphous intermediate is crystallized for 60 minutes at a temperature of 1450° C. The product P calculates as:

$$P = 200 \ (m^2/g) \times 0.25 \ (h) \times 5 \ (ppm) = 250 \ (<500).$$

The oxygen content of the crystallized powder is determined by inert gas fusion technique and is 0.22% by weight.

What is claimed is:

1. $Si_3N_4$ powder wherein the total oxygen content of the powder is 0.4% by weight or less.
2. $Si_3N_4$ powder wherein the total oxygen content of the powder is 0.25% by weight or less.
3. An $Si_3N_4$ powder having an oxygen content of 0.4% by weight or less formed by the process of preparing an amorphous $Si_3N_4$ intermediate by reacting an Si-containing compound with an N-containing compound and crystallizing the intermediate, the process being characterized in that the reactants and process conditions are selected such that the value $P_G$ is smaller than 1000 in accordance with the equation $$P = BET \times C_{H_2O} \times t < P_G$$

wherein P represents the multiplication product of
   (i) the specific surface of the amorphous intermediate (BET in m²g/),
   (ii) the moisture content $C_{H_2O}$ (in volume ppm) of the atmosphere during handling, and
   (iii) the time t in hours required for handling the amorphous intermediate.

* * * * *